United States Patent [19]

Besnard et al.

[11] Patent Number: 5,350,524
[45] Date of Patent: Sep. 27, 1994

US005350524A

[54] MIXED POLYSACCHARIDE PRECIPITATING AGENTS AND INSULATING ARTICLES SHAPED THEREFROM

[75] Inventors: Marie-Madeleine Besnard, Antony; Claire David; Magali Knipper, both of Paris, France

[73] Assignee: Rhone-Poulenc Chimie, Courbevoie, France

[21] Appl. No.: 737,766

[22] Filed: Jul. 30, 1991

[30] Foreign Application Priority Data

Jul. 30, 1990 [FR] France ................. 90 09670

[51] Int. Cl.$^5$ ............... C07H 1/06; C02F 1/00
[52] U.S. Cl. ................... 210/728; 210/730; 514/54; 536/123.12; 536/124; 536/3; 536/56; 536/102; 536/123; 435/101
[58] Field of Search ............ 536/123, 114, 124, 56, 536/95, 96, 102, 3, 123.12; 514/54, 57; 435/101; 502/150; 536/56, 95, 96, 102, 3, 123.12; 210/696, 698

[56] References Cited

U.S. PATENT DOCUMENTS

| | | | |
|---|---|---|---|
| 3,350,304 | 10/1967 | Bacon et al. | 210/728 |
| 3,406,114 | 10/1968 | Goren | 435/101 |
| 4,363,733 | 12/1982 | Meiller et al. | 435/104 |
| 4,673,644 | 6/1987 | Harada et al. | 435/172.1 |
| 4,803,264 | 2/1989 | Krijnen et al. | 536/114 |
| 4,900,457 | 2/1990 | Clarke-Sturman et al. | 536/114 |
| 4,935,447 | 6/1990 | Philips et al. | 514/75 |
| 4,983,563 | 1/1991 | Chopin et al. | 502/150 |

FOREIGN PATENT DOCUMENTS 0013217 7/1989 European Pat. Off. .
2603272 3/1988 France .

*Primary Examiner*—Johnnie R. Brown
*Assistant Examiner*—Evertt White
*Attorney, Agent, or Firm*—Burns, Doane, Swecker & Mathis

[57] ABSTRACT

Mixed polysaccharide compositions, well adopted for flocculating/precipitating solid particulates from liquid dispersions thereof and for the shaping of insulating articles therefrom, comprise (i) at least one succinoglycan polysaccharide, the basic recurring structural unit of which comprising glucose, galactose and succinyl moieties, and (ii) at least one natural polysaccharide or derivative thereof.

32 Claims, No Drawings

MIXED POLYSACCHARIDE PRECIPITATING AGENTS AND INSULATING ARTICLES SHAPED THEREFROM

CROSS-REFERENCE TO COMPANION APPLICATION

Our copending application Ser. No. 07/737,714, now U.S. Pat. No. 5,221,790, filed concurrently herewith and assigned to the assignee hereof, is related to this application.

BACKGROUND OF THE INVENTION

1. Field of the Invention

The present invention relates to novel compositions/precipitating agents comprising a polysaccharide of succinoglycan type produced by microbial fermentation and a natural polysaccharide or derivative thereof, as well as to insulating shaped articles fabricated therefrom.

2. Description of the Prior Art

Polysaccharides whose basic structural unit contains glucose, galactose and succinyl moieties are well known to this art. They are generally referred to as succinoglycans. These polysaccharides are typically prepared by fermentation of a carbon source by means of a microorganism.

Such polysaccharides and processes for the preparation thereof have been described, in particular, in published European Patent Application No. 351,303, in published European Patent Application No. 40,445 as well as in Clarence A. Knutson, *Carbohydrate Research*, 73, pp. 159–168 (1979).

These polysaccharides may be employed for thickening aqueous solutions and for stabilizing, or for maintaining in suspension, aqueous dispersions of particles.

Furthermore, polysaccharides of natural origin are also known to this art, as are derivatives of these polysaccharides, prepared, for example, by the semi-synthetic route, and which may also be used for thickening, stabilizing or maintaining suspensions.

These natural polysaccharides are generally obtained from plants such as algae, or from roots, seeds or tubers.

It has now surprisingly been found that compositions comprising such polysaccharides behave differently or even, in certain instances, in opposite manner, than as would be expected.

SUMMARY OF THE INVENTION

Accordingly, a major object of the present invention is the provision of novel compositions of matter comprising at least one succinoglycan, the basic recurring structural unit of which contains glucose and galactose moieties and at least one succinyl moiety, as well as at least one natural polysaccharide or derivative thereof.

DETAILED DESCRIPTION OF THE PREFERRED EMBODIMENTS OF THE INVENTION

More particularly according to the present invention, such succinoglycans typically contain glucose, galactose and a succinyl residue in molar ratios ranging from 5 to 8/1 to 3/0.5 to 2, respectively, and, preferably, from 6 to 7.5/1 to 2/0.5 to 1.

In addition, the basic structural unit of said succinoglycans may contain other organic acid residues such as pyruvyl or acetyl residues, as well as other sugars such as glucuronic acid and/or mannose.

The molar ratios between the glucose and such organic acid residues generally range from 5 to 8/0.01 to 2.

The molar ratios between said other sugars and glucose generally range from 0 to 1/5 to 8.

The succinoglycans may be prepared by microbial fermentation, for example by fermentation of a medium comprising at least one carbon source, by means of a microorganism preferably belonging to the Arthrobacter genus such as *Arthrobacter stabilis*, in particular the *Arthrobacter stabilis* NRRL-B-1973 strain, to the Agrobacterium genus such as *Agrobacterium tumefaciens*, *Agrobacterium radiobacter* or *Agrobacterium rhizogenes*, to the Rhizobium genus, in particular *Rhizobium meliloti* and *Rhizobium trifolii*, to the Alcaligenes genus such as *Alcaligenes faecalis*, in particular the Myxogenes variety or to the Pseudomonas genus, in particular the *Pseudomonas sp.* 11264 and NCIB 11592 strains. Succinoglycans prepared by means of strains belonging to the Agrobacterium genus, particularly the *Agrobacterium tumefaciens* species, are particularly advantageous according to the present invention.

Among the latter succinoglycans, those prepared by fermentation of a carbon source by means of the *Agrobacterium tumefaciens* I-736 strain deposited at the Collection Nationale de Culture des Microorganismes, (CNCM) (National Collection of Microbial Cultures) are particularly preferred.

Such a succinoglycan as well as a process for the preparation thereof are described in published European Patent Application No. 351,303.

Fermentation media comprising the carbon source as well as the fermentation processes are well described in the literature; compare, in particular, published European Patent Applications Nos. 351,303 and 40,445.

The natural polysaccharides and derivatives thereof according to the present invention may be of animal or plant origin. Advantageously, such polysaccharides are gums. By "gums" are intended compounds which, together with water, provide colloidal solutions precipitable by an alcohol such as methanol, ethanol or isopropanol.

Polysaccharides of animal origin may be obtained from the carapace of certain animals such as crustacea, like chitin. Natural polysaccharides of plant origin may be obtained from algae, seeds, roots or tubers. Exemplary thereof are galactomannans such as guar gum, carob gum, tara gum, cassia gum, glucommanans such as konjakmannan, alginates, in particular sodium alginate, gum acacia, gum arabic, agar or the various starches. The preferred natural polysaccharides comprise the alginates.

Exemplary natural polysaccharide derivatives include the chitin derivatives such as chitosan, cellulose semi-synthetic derivatives such as hydroxymethylcellulose, hydroxymethylpropylcellulose, hydroxyethylcellulose or hydroxypropylcellulose. Also exemplary are starch and galactomannan cationic derivatives, in particular cationic guar gum. Such cationic derivatives are well known to this art and are typically available commercially. They are generally prepared by etherification or esterification of the free hydroxyl groups of the sugars which constitute the natural polysaccharide, by means of quaternary ammonium organic compounds such as 2,3-epoxymethylammonium chloride.

The natural polysaccharides or derivatives thereof according to the present invention have a molecular weight which is typically greater than 200,000, generally ranging from 200,000 to 3,000,000.

According to this invention, the weight ratios between the succinoglycan and the natural polysaccharide or derivative thereof range from 5/95 to 95/5, preferably from 30/70 to 70/30.

In addition to the polysaccharides described above, the composition according to the invention may comprise a flocculating additive.

By "flocculating additive" is intended a compound which permits or enhances the formation of flocs during the suspension in aqueous solution, of said succinoglycans and said natural polysaccharides or derivatives thereof.

Exemplary flocculating additives include quaternary ammonium organic compounds, ammonium hydroxide, synthetic anionic organic polymers or copolymers and their salts, as well as compounds based on a metal of the iron and/or aluminum group, such as aluminum and/or iron sulfate, chloride, hydroxychloride or chlorosulfate.

Particularly representative quaternary ammonium compounds are n-alkyltrimethylammonium, n-dialkyldimethylammonium, n-alkyldimethylammonium, n-alkylpyridinium and benzalkonium salts. In these compounds, the alkyl moiety advantageously has 1 to 30, preferably 8 to 24 carbon atoms.

Such anionic organic polymers or copolymers may be based on acrylic acid or methacrylic acid such as polyacrylic acid and polymethacrylic acid.

The weight of flocculating agent contained in the compositions of the invention typically ranges from 0.0001% to 0.03% of the total weight of the succinoglycans and said natural polysaccharides or derivatives thereof.

The compositions according to the invention may be formulated by a simple mixing of the constituent succinoglycans and the natural polysaccharides and/or derivatives thereof prepared as a powder, or by mixing a succinoglycan or one of said powdered polysaccharides into an aqueous solution comprising the other compound.

Preferably, the succinoglycan and the polysaccharide may also be suspended in solution separately and then the two solutions obtained mixed with stirring. The stirring must be adequate in order to obtain a homogeneous solution. The flocculating additive may be added at any time in one or the other of said solutions, but preferably in said homogeneous solution. The latter may comprise 0.001% to 0.3% by weight, preferably 0.002% to 0.6% by weight of the compositions of the invention.

The present invention also features a process for precipitating, in an aqueous medium, a dispersion of solid particles by means of the above compositions.

Such particles may be of organic or inorganic nature and of various sizes. Their concentration in the aqueous medium wherein they are dispersed is variable. It should be appreciated that such a precipitative effect of the compositions of the invention is unexpected and surprising, given that it is known to this art that succinoglycans and natural polysaccharides or derivatives thereof are typically used as suspending agents.

It is necessary, however, in order to attain a good precipitation, for the concentration of the compositions according to the invention in the aqueous medium to range from 0.001% to 0.5%, preferably from 0.005% to 0.2% by weight.

During such process, the compositions according to the invention may be mixed with said dispersion, for example in the form of a homogeneous solution, as described above.

The process described above may be used, in particular, for treating waste waters which comprise solid particles in suspension and which are flocculated and then precipitated.

This process may also be used for the preparation of insulating shaped articles and materials based on mineral fibers and comprising the compositions of the invention.

Such shaped articles/materials may be provided in the form of panels or plates which can withstand very high temperatures. They may therefore be used for protection against fire, as refractory insulating material for thermal ovens and combustion chambers or even as acoustic insulating material.

In addition to such mineral or inorganic fibers and a composition according to the invention, these insulating shaped articles may also comprise at least one mineral filler material.

Exemplary such mineral fibers include boron fibers, carbon fibers, glass fibers and ceramic fibers such as alumina and silica-alumina fibers and silica-alumina fibers modified by other oxides such as chromium, boron, zirconium, calcium and magnesium oxides, titanium dioxide, silicon carbide, silicon nitride, carbonitride and boron nitride fibers, as well as fibers of mineral wools such as diabase wool, rock wool or slag wool. These fibers advantageously have a length of 0.1 to 50 mm and a diameter of 1 to 20 microns.

Exemplary mineral fillers which comprise the composition of the insulating shaped article include silicas such as colloidal silicas, aluminas, bentonite, magnesia, calcium carbonate, kaolin or aluminum silicates.

The insulating shaped articles according to the invention may be produced from an aqueous dispersion of mineral fibers which may optionally comprise the mineral filler with which the composition according to the invention is mixed, such that its concentration by weight in the dispersion is as indicated above.

Such a dispersion may comprise 1% to 10%, preferably 4% to 6% by weight of dry solids.

The mixture of the dispersion and the composition according to the invention causes precipitation of the fibers and, optionally, of the dispersed mineral fillers.

The solid materials may then be separated from the supernatant aqueous phase by a physical separation process, for example by filtration. Thereafter, said solid materials may be conditioned, dried and optionally baked. The conditioning is carried out according to conventional technique as a function of the intended ultimate use of the insulating shaped article.

After drying, the latter usually comprises 30% to 90% by weight of mineral fibers, optionally, 5% to 60% by weight of mineral fillers, and 0.5% to 7%, preferably 1% to 5% by weight of the composition according to the invention.

The insulating shaped articles comprising a composition according to the invention exhibit enhanced mechanical properties relative to the known insulating materials. But, in particular, by means of such composition, it is possible to considerably reduce the proportion of organic materials contained in the insulating shaped article. However, too high an amount of organic material presents numerous disadvantages, in particular the emission of a black smoke during baking of the insulating shaped article.

Utilizing a composition according to the invention, it is also possible to manufacture items based on wood fibers, in particular via a process similar to that employed for manufacturing said insulating shaped articles described above. According to one such process, the mineral fibers are replaced by wood fibers.

In order to further illustrate the present invention and the advantages thereof, the following specific examples are given, it being understood that same are intended only as illustrative and in nowise limitative.

EXAMPLE 1

100 g of a solution of polysaccharides were prepared by mixing 22 g of a 0.5% Rhéozan ® solution with 22 g of a 1% cationic guar gum solution and 56 g of water.

Rhéozan ® is a polysaccharide of the succinoglycan type which is marketed by Rhône-Poulenc. It may be prepared by fermentation of a carbon source by means of an *Agrobacterium tumefaciens* I-736 strain.

The cationic guar gum used was a product marketed by Meyhall under the trademark Meyproid 9806.

22 g of alumina-silica ceramic fibers were dispersed in 2,100 g of water in a 5-liter beaker with stirring at 500 revolutions/min. The solution of polysaccharides was then introduced into this dispersion while maintaining the stirring, After two minutes, the stirring was stopped. The fibers precipitated. The precipitated fibers were separated from the aqueous solution by filtration under vacuum in a Buchner funnel. The filter cake was dried.

The insulating shaped article thus produced contained 1.5% by weight of polysaccharides relative to the weight of the fibers.

EXAMPLE 2

The procedure of Example 1 was repeated, but instead of adding 56 g of water, 56 g of a 0.22% aqueous solution of cationic starch were added. The addition of cationic starch permitted a more rapid precipitation of the fibers and the production of an insulating shaped article whose mechanical properties were further improved relative to those of the insulating shaped article of Example 1. The insulating shaped article comprised 2.045% by weight of polysaccharide relative to the weight of the fibers.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. In a process for precipitating solid particulates from an aqueous dispersion thereof by adding an effective amount of a precipitating agent thereto, the improvement which comprises utilizing as such precipitating agent a mixed polysaccharide composition of matter which is capable of precipitating a dispersion of solid particles in an aqueous medium, comprising:
   (i) at least one succinoglycan polysaccharide, the basic recurring structural unit of which comprises glucose, galactose and succinyl moieties, and
   (ii) at least one natural polysaccharide or derivative thereof, wherein in the aqueous medium the concentration of said mixed polysaccharide composition ranges from 0.001% to 0.5%.

2. The mixed polysaccharide as defined by claim 1, said at least one succinylglycan polysaccharide comprising glucose, galactose and succinyl moieties in molar ratios of from 5 to 8/1 to 3/0.5 to 2, respectively.

3. The mixed polysaccharide composition as defined by claim 2, said molar ratios ranging from 6 to 7.5/1 to 2/0.5 to 1, respectively.

4. The mixed polysaccharide composition as defined by claim 1, said at least one succinoglycan polysaccharide further comprising organic acid and/or mannose and/or glucuronic acid moieties.

5. The mixed polysaccharide composition as defined by claim 4, said at least one succinoglycan polysaccharide further comprising acetyl or pyruvyl moieties.

6. The mixed polysaccharide composition as defined by claim 1, said at least one succinoglycan polysaccharide (i) having been prepared by Agrobacterium, Arthrobacter, Rhizobium, Alcaligenes or Pseudomonas fermentation of a nutrient medium comprising at least one carbon source.

7. The mixed polysaccharide composition as defined by claim 6, said at least one succinoglycan polysaccharide (i) having been prepared by *Agrobacterium tumefaciens* I-736 fermentation.

8. The mixed polysaccharide composition as defined by claim 1, comprising at least one plant or animal polysaccharide (ii) or derivative thereof.

9. The mixed polysaccharide composition as defined by claim 8, said at least one plant or animal polysaccharide (ii) or derivative thereof comprising a gum.

10. The mixed polysaccharide composition as defined by claim 8, comprising a cellulose derivative.

11. The mixed polysaccharide composition as defined by claim 10, said cellulose derivative comprising a cellulose derivative selected from the group consisting of hydroxymethylcellulose, hydroxyethylcellulose, hydroxymethylpropylcellulose and hydroxypropylcellulose.

12. The mixed polysaccharide composition as defined by claim 8, comprising a cationic starch or galactomannan.

13. The mixed polysaccharide composition as defined by claim 1, wherein the weight ratio between the at least one succinoglycan polysaccharide and the at least one natural polysaccharide or derivative thereof ranges from 5/95 to 95/5.

14. The mixed polysaccharide composition as defined by claim 13, said weight ratio ranging from 30/70 to 70/30.

15. The mixed polysaccharide composition as defined by claim 1, further comprising a flocculating agent.

16. The mixed polysaccharide composition as defined by claim 15, said flocculating agent comprising a quaternary ammonium organic compound, ammonium hydroxide, a synthetic anionic organic polymer or copolymer or salt thereof, or an iron or aluminum group compound.

17. The process as defined by claim 1, comprising adding such mixed polysaccharide precipitating agent to a concentration ranging from 0.001% to 0.5% by weight.

18. The process as defined by claim 17, said concentration ranging from 0.005% to 0.2% by weight.

19. The process as defined by claim 1, said solid particulates comprising inorganic fibers.

20. The process as defined by claim 19, said solid particulates also comprising inorganic filler material.

21. The process as defined by claim 1, said solid particulates comprising wood fibers.

22. The process as defined by claim 1, said at least one natural polysaccharide comprising a natural polysaccharide selected from the group consisting of a glucomannan, a galactomannan, an alginate and a starch.

23. An insulating shaped article, comprising an insulating amount of inorganic fibers and a mixed polysaccharide composition of matter which is capable of precipitating a dispersion of solid particles in an aqueous medium, comprising:
   (i) at least one succinoglycan polysaccharide, the basic recurring structural unit of which comprises glucose, galactose and succinyl moieties, and
   (ii) at least one natural polysaccharide or derivative thereof, wherein in the aqueous medium the concentration of said mixed polysaccharide composition ranges from 0.001% to 0.5%.

24. The insulating shaped article as defined by claim 23, further comprising at least one inorganic filler material.

25. An insulating shaped article, comprising an insulating amount of wood fibers and a mixed polysaccharide composition of matter which is capable of precipitating a dispersion of solid particles in an aqueous medium, comprising:
   (i) at least one succinoglycan polysaccharide, the basic recurring structural unit of which comprises glucose, galactose and succinyl moieties, and
   (ii) at least one natural polysaccharide or derivative thereof, wherein in the aqueous medium the concentration of said mixed polysaccharide composition ranges from 0.001% to 0.5%.

26. The insulating shaped article as defined by claim 25, further comprising at least one inorganic filler material.

27. In a process for the purification of a water supply having particulate impurities suspended therein by flocculating/precipitating such impurities therefrom, the improvement which comprises flocculating/precipitating such impurities with a mixed polysaccharide composition of matter which is capable of precipitating a dispersion of solid particles in an aqueous medium, comprising:
   (i) at least one succinoglycan polysaccharide, the basic recurring structural unit of which comprises glucose, galactose and succinyl moieties, and
   (ii) at least one natural polysaccharide or derivative thereof, wherein in the aqueous medium the concentration of said mixed polysaccharide composition ranges from 0.001% to 0.5%.

28. A method for precipitating ceramic fibers from dispersion comprising adding to a ceramic fiber containing dispersion an effective amount of a precipitating agent comprising a succinoglycan type polysaccharide produced by *Agrobacterium tumefaciens* I-736 and at least one natural polysaccharide or derivative thereof.

29. The method of claim 28 wherein the natural polysaccharide is cationic guar gum or cationic starch.

30. The method of claim 28 wherein the weight ratio between said succinoglycan polysaccharide and the natural polysaccharide ranges from 5/95 to 95/5.

31. The method of claim 30 wherein the weight ratio ranges from 70/30 to 30/70.

32. The method of claim 31 wherein the ceramic fibers comprise alumina/silica fibers.

* * * * *